United States Patent [19]

Scordialo

[11] Patent Number: 4,548,719
[45] Date of Patent: Oct. 22, 1985

[54] METHOD FOR DEHYDRATING SLUDGE

[75] Inventor: Angelo Scordialo, Darmstadt, Fed. Rep. of Germany

[73] Assignee: Röhm GmbH, Darmstadt, Fed. Rep. of Germany

[21] Appl. No.: 483,648

[22] Filed: Apr. 11, 1983

[30] Foreign Application Priority Data

Apr. 29, 1982 [DE] Fed. Rep. of Germany ....... 3215894

[51] Int. Cl.$^4$ ...................... B01D 21/01; B01D 29/00; B01D 37/02
[52] U.S. Cl. .................................. 210/732; 210/733; 210/734; 210/735; 210/506; 210/770; 210/778
[58] Field of Search ............... 210/714, 715, 723, 728, 210/734, 735, 609, 727, 725, 777, 778, 770, 732, 733, 506

[56] References Cited

U.S. PATENT DOCUMENTS

| 3,235,492 | 2/1966 | Andresen et al. | 210/778 X |
| 3,338,828 | 8/1967 | Clark | 210/715 |
| 3,388,060 | 6/1968 | Clark | 210/714 |
| 3,847,806 | 11/1974 | Kuroiwa et al. | 210/777 X |
| 3,932,275 | 1/1976 | Mewes et al. | 210/714 |
| 4,007,113 | 2/1977 | Ostreicher | 210/638 |
| 4,235,795 | 11/1980 | Cohen | 210/778 X |
| 4,440,867 | 4/1984 | Sabherwal | 210/660 |

FOREIGN PATENT DOCUMENTS

| 1517705 | 9/1969 | Fed. Rep. of Germany . |
| 2249607 | 4/1974 | Fed. Rep. of Germany . |
| 2327869 | 2/1975 | Fed. Rep. of Germany . |
| 2600926 | 7/1977 | Fed. Rep. of Germany . |
| 2730009 | 1/1979 | Fed. Rep. of Germany . |
| 1095003 | 12/1967 | United Kingdom . |
| 2098590 | 11/1982 | United Kingdom . |

OTHER PUBLICATIONS

Kirk-Othmer, Encyclopedia of Chemical Technology, vol. 14, Interscience, New York, pp. 910, 911, 929.
Kirk-Othmer, Encyclopedia of Chemical Technology, 3rd Edition, vol. 10, John Wiley & Sons, New York 322.
Pruchas, "Industrial Filtration of Liquds", 2nd. Edition, Leonard Hill, London, 1971, pp. 95, 105, 106.

Primary Examiner—Richard V. Fisher
Assistant Examiner—W. Gary Jones

[57] ABSTRACT

A method for dehydrating sludge, and particularly sewage sludge, includes adding a particulate, thermally expanded volcanic material and a polyelectrolyte to said sludge prior to filtration, said volcanic material having a bulk density of less than 0.09 kg/liter and an average particle size ranging from 20 to 300 microns.

6 Claims, No Drawings

METHOD FOR DEHYDRATING SLUDGE

The present invention relates to the dehydration of sludge, and particularly of sewage sludge (i.e. sludge from waste water treatment installations), by filtering such sludge in the presence of expanded volcanic material and of a polyelectrolyte.

Sewage sludge is obtained in the purification of municipal and industrial waste waters. Such sludges have a water content ranging from 70 to 98 weight percent, depending, among other things, on whether they contain predominantly organic or inorganic solid constituents.

One method of dehydrating sludges, which from a physical point of view are concentrated aqueous suspensions of flocculent and/or colloidal solids, is mechanical filtration. As a rule, however, simple filtration of the sludges will not produce the desired results, mainly because the filters are quickly clogged by the colloidal constitutents. Industry has therefore sought to find ways to render sludges mechanically filterable. Separation of the solids from the liquid phase can be achieved by breaking the emulsion, by flocculation, and by precipitation. [See Ullmanns Enzyklopaedie der Technischen Chemie ("Encyclopedia of Technical Chemistry") 4th ed.; vol. 6, pp. 417–464, vol. 11, p. 581, and vol. 2, p. 190; Verlag Chemie.]

Flocculation aids which have come into use of late are, in particular, synthetic polyelectrolytes. However, sludges which have been treated with polyelectrolytes are nevertheless often difficult to filter. Moreover, most polyelectrolytes do not possess sufficient shear stability to assure satisfactory dehydration.

To improve filterability, predominantly inorganic solids such as alkaline earth metal carbonates, clays, kieselguhr or diatomaceous earth, silicates, asbestos fibers, and the like are added as filter aids. Moreover, ashes, and in particular the ash obtained from the incineration of dehydrated sludge, are used as filter aids (cf. German patent 15 17 705). The effect of these filter aids is probably due, among other things, to their forming a porous supporting structure in the filter cake during filtration. This prevents the formation of compact filter layers which would hinder the passage of liquid. However, substantial amounts of such filter aids are required. For example when ashes are used, at least two parts by weight of ash are needed per part by weight of sludge. Among other things, this renders processes for the incineration of sludge less worthwhile.

To reduce the necessary quantities of filter aids, and in particular of ash, it has been proposed further to add a polyelectrolytic precipitating agent to sludge (cf. German Pat. Nos. 22 49 607, 23 27 869, and 26 00 926).

The hydrophilicity of inorganic filter aids has been cited as a drawback. The materials generally used take up considerable amounts of water. Energy input is required to remove the major portion of this bound water. The filter cake obtained in filtration therefore still contains a fairly high percentage of moisture. Finally, filtration methods will not produce the desired drastic reduction in the weight or volume of the solids obtained. It has therefore been proposed to admix with the sludges, prior to filtration, solid filter aids which have been pretreated with organic compounds containing hydroxy- and/or alkoxysilyl groups (cf. German Pat. No. 27 30 009). Kaolins which have been so pretreated are preferred.

The use of volcanic ash (volcanic liparite or quartz porphyry glasses with many small water inclusions which when heated to above 1200° C. expand to form a lightweight "rock sponge") is known from general filter technology. For the removal of colloidal turbidity, the rentention of submicroscopic particles, and the removal of bacterial contamination, U.S. Pat. No. 4,007,113 describes a filter medium consisting of a self-bonding fibrous matrix material (cellulose) and, among other things, volcanic ash whose surface has been treated with a cationic melamine-formaldehyde resin.

Thus, there has been a need for providing sludge-dehydrating aids, particularly for the dehydration of industrial and municipal sewage sludges, which when added in substantially smaller amounts than heretofore will produce technically satisfactory sludge filtration results. More particularly, it is sought to provide filter aids permitting technically satisfactory dehydration even when used in amounts of less than twice the weight of the sludge solids. These are to be suitable for use especially in the dehydration of sewage sludges using recessed-plate filter presses or pressure filters. The filtration efficiency aimed at is at least 25 weight percent of solids in the filter cake.

The above object is accomplished by means of the process in accordance with the present invention, which involves the use, in the presence of a polyelectrolyte, of an expanded volcanic material having a bulk density less than 0.09 kilograms/liter and an average particle size from 20 to 300 microns. The aid is added in an amount from 2 to 10 kilograms per cubic meter of wet sludge prior to filtration.

The particulate, thermally expanded volcanic material is generally formed of silicates, and more particularly of liparite or quartz porphyry glasses, which due to their natural origin have water inclusions and which when heated to above 1200° C. for example, expand to form a very lightweight rock "sponge". The thermally expanded volume may be more than 20 times the original volume.

The thermally expanded volcanic materials described above and hereinafter referred to simply as 'expanded material' are commercially available. A grind of the expanded material to a particle size consistent with the aforementioned disclosure has proved suitable. This grind can be obtained conventionally, for example by means of a hammer mill.

Prior art electrolytes (see German Pat. Nos. 22 49 607, 23 27 869, and 26 00 926) are used as flocculating agents in addition to the expanded material. Cationic flocculants such as poly-N,N-dialkylaminoalkyl -acrylate or -methacrylate in neutralized or quaternized form, for example poly-N,N-dimethylaminoethyl methacylate, or also poly-N, N-dimethylaminomethacrylamide, polyethyleneamine, etc., are preferred.

Suitable anionic polyelectrolytes are generally derived from amides of unsaturated carboxylic acids and/or the sodium or ammonium salts of unsaturated carboxylic acids or sulfonic acids. In particular, high molecular weight water soluble polymers such as partially hydrolyzed polyacrylamide and/or polymethacrylamide, polyacrylates and polymethacrylates such as ammonium or alkali metal acrylates and methacrylates, sulfonates such as sodium polyvinyl sulfonate and sodium polystyrene sulfonate, as well as copolymers and polymer mixtures, are suitable.

As a rule, the degree of polymerization of the anionic polyelectrolytes to be used in accordance with the invention will be greater than 1,000, corresponding approximately to molecular weights above $10^5$. However, the type of polymer used is an important factor.

The amount of polyelectrolyte to be used depends largely on the type and solids content of the sewage sludge to be dehydrated. From 1 to 100 ppm, and preferably from 5 to 50 ppm, of polymer, based on the weight of the sludge, will serve as a guide value.

An embodiment of the process of the invention in which the particulate expanded material is rendered hydrophobic is particularly preferred. This is preferably done by the use of organosilicon compounds, and in particular of organofunctional alkoxysilanes and alkylalkoxysilanes, and especially alkyltrialkoxysilanes. Expanded material which has been treated with prior art copolymers of vinyltrialkoxysilanes and maleic anhydride is particularly suitable.

The selection of the organosilicon compounds and the actual coating of the expanded material for the purpose of rendering it hydrophobic may be made by closely following the teachings of published German patent application No. 27 30 009.

Suitable organofunctional silanes are those of the formula

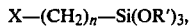

$$X-(CH_2)_n-Si(OR')_3,$$

wherein X is amino, alkylamino, or aminoalkylamino, mercapto, or the group

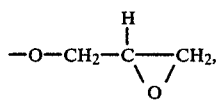

$$-O-CH_2-\underset{H}{\overset{|}{C}}\underset{O}{\overset{\diagdown \diagup}{\phantom{X}}}CH_2,$$

R' is alkyl or alkoxyalkyl having from 1 to 10 carbon atoms, and n has a value between 1 and 10.

These compounds include beta-aminoethyltrimethoxysilane, gamma-aminopropyltrimethoxysilane, gamma-aminopropyltrimethoxyethoxysilane, delta-aminobutyltriethoxysilane, beta-aminoethyl-gamma-aminopropyltriethoxysilane, and glycidyloxypropyltrimethoxysilane, for example.

The likewise preferred alkyltrialkoxysilanes may carry $C_1$-to-$C_{15}$ alkyl groups, and preferably $C_1$-to-$C_6$ alkyl groups. The alkoxy groups preferably have from 1 to 5 carbon atoms. The copolymers derived from the reaction of vinyl trialkoxysilane and maleic anhydride contain units of the formula

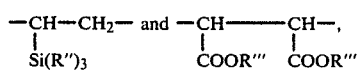

wherein R'' is alkoxy having from 1 to 8 carbon atoms, OH, or an oxygen bridge which is linked to a further silyl unit, and R''' is hydrogen or alkyl having from 1 to 10 carbon atoms. When this maleic anhydride/vinyltrialkoxysilane copolymer is heated with alcohol, copolymers are obtained having alkoxysilane units, alpha, beta-dicarboxylic half-esters units, and anhydride units in an irregular sequence. Products in which the half-esters have been hydrolyzed are also suitable.

The organosilicon compounds may be deposited on the expanded material conventionally, for example by mixing the latter with solutions of these compounds, preferably in appropriate organic solvents and particularly in alcoholic solutions, or, to the extent that they are soluble in water, in an aqueous solution. When silanes are used, it may be advisable to mix them undiluted with the expanded material.

Mixing, which may be done in a plowshare-type of mixer for example, is followed by drying at temperatures up to about 150° C., and preferably between 70° and 130° C. The amount of the silicon compound deposited on the expanded material generally is at least 0.1 weight percent, and preferably ranges from 0.5 to 5 weight percent. However, even materials with a coating of over 10 percent can be used without their effectiveness as filter aids being markedly diminished.

The filter aids to be used in accordance with the invention may be mixed conventionally with sludges, and particularly with waste water sludges. This can be done with the usual mixing means. The amount of expanded material, and preferably expanded material which has been rendered hydrophobic, to be admixed ranges from 2 to 10 kg per cubic meter of wet sludge.

The polyelectrolytes are preferably admixed as an 0.1 to 0.3% aqueous working solution after the volcanic ash has been added to a mixing vessel equipped with a low speed agitator or, in a continuous process, in the feed line. Metering the polyelectrolyte into the feed line downstream of the feed pump in proportion to the volume of sludge handled has proved satisfactory. It has been found that when internal structures which promote mixing, for example static mixers, are used, the optimum point of introduction for the electrolyte is ahead of the feed pipe to the pressure filter.

Dehydration is carried out in pressure filters, and preferably in plate-and-frame or recessed-plate filter presses, at pressures ranging from 5 to 15 bars and filtration times ranging from 30 to 180 minutes. Suitable filter media are fabrics, such as polyamide or polypropylene fabrics, for example monofilament fabrics.

A better understanding of the present invention and of its many advantages will be had by referring to the following specific examples, given by way of illustration.

The expanded material used in the Examples which follow was "Volcanic Ash, Type VA-HR" of the Filter Media Company, Houston, Tex. The material has a bulk density of 0.045 kg/liter, a wet volume between 0.09 and 0.11 kg/liter, and comprises particles having a diameter up to 300 microns, predominantly 20–200 microns. The ash is an aluminum silicate analyzing as 85% $SiO_2$ and 13% $Al_2O_3$. For imparting hydrophobicity, a product comprising octyltriethoxysilane (for example, the commercial product "Dynasilan" of Dynamit Nobel) is preferably used.

EXAMPLE 1

An anaerobically stabilized sewage sludge with a solids content of 3.5% (i.e. 35 kg dry solids per cubic meter of sludge) was mixed with 10 kg/m³ of untreated expanded ash material. The ground and classified material, having a particle size range from 0 to 0.3 mm, was metered dry into a storage tank equipped with a paddle mixer. After homogenization, the sewage sludge so pretreated was drawn off with a piston diaphragm pump and fed to a recessed-plate filter press. A polyelectrolyte which is a copolymer comprising acrylamide and 2-trimethylammonium-ethyl methacrylate (50:50 wt. %) was then metered into the discharge pipe of the piston diaphragm pump, but ahead of the recessed-plate filter press, at the rate of 100 or 150 g/m³ of sludge being handled. Filtration was completed after a filtration time of 1.5 hours and a filtration pressure of 15 bars. The dehydrated filter cake had a solids content of over 30%. Except for a slightly turbid initial run, the filtrate appeared to be clear and had a solids content of less than 0.1%.

EXAMPLE 2

A thickened biological residual sludge with a solids content of 3.0% was pretreated with 10 kg of silanized expanded material. The octyltriethoxysilane silicon compound used for imparting hydrophobicity was applied in a conventional manner in an amount of 0.2 wt. %. For this purpose, the expanded ash was dispersed in an alcoholic solution of the hydrophobizing agent, then dried at a temperature up to 150° C., preferably at 80°–130° C. as taught in aforementioned DE-OS No. 27 30 009. The filter aid, which had been rendered hydrophobic, was introduced ahead of a displacement pump by means of a static mixer. Downstream of the displacement pump, 0.1% of the polyelectrolyte of Example 1 was added conventionally in a metered amount of 150 g. After a filtration time of 120 minutes in a filter press at a filtration pressure of 15 bars, the dehydrated filter cake had a solids content of 29.4%.

EXAMPLE 3

A sewage sludge containing oil and heavy metal hydroxide from an emulsion breaking unit was treated with filter aid and polyelectrolyte in the manner described in Example 1. The filter aid was used at the rate of 3 kg/m$^3$ and the polyelectrolyte at the rate of 150 g/m$^3$. After filtration, the dehydrated filter cake had a solids content of 27.2%.

An expanded material pretreated with polyelectrolyte will, under otherwise identical conditions, give comparable results.

The results of these Examples are summarized in following Table I, which also includes the results of a prior art sludge treatment comparable with Example 1.

TABLE I

| Sewage sludge | Filter aid | Polyelectrolyte | Solids in filter cake | |
|---|---|---|---|---|
| Anaerobically stabilized sewage sludge, | 10 kg/m$^3$ | 100 g/m$^3$ | 33.5% | cf. Example 1 |
| 3.5% solids content | 10 kg/m$^3$ | 150 g/m$^3$ | 34.6% | |
| Comparison treatment | 20 kg lime/m$^3$ | 5 kg FeCl$_3$.6H$_2$O/m$^3$ | 31.4% | |
| Biological residual sludge, 3.0% solids content | 10 kg/m$^3$ silanized with 2 wt. % | 150 g/m$^3$ | 29.4% | cf. Example 2 |
| Oil sludge pretreated with heavy metal salts | 3 kg/m$^3$ | 150 g/m$^3$ | 27.2% | cf. Example 3 |

What is claimed is:

1. A method for dehydating sewage sludge by filtration using a filter aid, which method comprises adding a polyelectrolyte and from 2 to 10 kg of hydrophobized particulate thermally expanded volcanic material to each cubic meter of wet sludge, said material having a bulk density of less than 0.09 kg/liter an an average particle size ranging from 20 to 300 microns, and then filtering said sludge.

2. A method as in claim 1 wherein said sewage sludge is dehydrated using a recessed-plate filter press or a pressure filter.

3. A method as in claim 1, wherein the weight of said particulate thermally expanded volcanic material used as filter aid is less than twice the dry weight of the sewage sludge to be dehydrated.

4. A method as in claim 1, wherein said particulate thermally expanded volcanic material used as filter aid is pretreated with said polyelectrolyte prior to addition to said sewage sludge.

5. A method as in claim 1, wherein the weight ratio between the particulate thermally expanded volcanic material and the polyelectrolyte is from 40:1 to 200:1.

6. A method as in claim 1, wherein said particulate thermally expanded volcanic material is hydrophobized by treatment with a siloxane.

* * * * *